Patented Feb. 2, 1937

2,069,573

UNITED STATES PATENT OFFICE 2,069,573

PHENOLIC COMPOUNDS

Elmer K. Bolton, Wilmington, Del., assignor to E. I. du Pont de Nemours & Company, Wilmington, Del., a corporation of Delaware No Drawing. Application February 6, 1935, Serial No. 5,301

4 Claims. (Cl. 260—154)

This invention relates to phenolic compounds, and more particularly to new dihydric phenols.

This invention has as an object the production of new dihydric phenols containing a disubstituted cyclohexane ring. A still further object is the production of phenols which when reacted with aliphatic dihalides yield resins having properties superior to those of similar resins made with the known phenols. Other objects will appear hereinafter.

The above and other objects appearing hereinafter are accomplished by condensing a mononuclear monohydric phenol, in which the para position to the phenolic hydroxyl is unoccupied, with a dialkylcyclohexanone of the kind described herein in the presence of a suitable catalyst, in accordance with the following more detailed description.

The monohydric phenols which are reacted with the dialkylcyclohexanones to make my new phenols are phenol itself and homologs of phenol having one or more alkyl substituents, provided no alkyl group occupies the para position to the phenolic hydroxyl. The substituted cyclohexanones employed in this invention are the 3,4- and 3,5-dialkylcyclohexanones. The most important of these, the 3,4- and 3,5-dimethylcyclohexanones, may be conveniently obtained by ring hydrogenation of the corresponding xylenols, followed by oxidation of the resulting secondary alcohol group to a ketone group.

In general, the process of this invention is carried out by reacting the phenol with the dialkylcyclohexanone, at substantially room temperature, and in substantially chemically equivalent proportions. The reaction is preferably conducted in the presence of an acid condensing agent, such as hydrochloric acid. The products obtained thereby are crystalline solids which are readily purifiable by crystallization from aromatic hydrocarbons or acetic acid solutions.

A suitable apparatus in which to conduct the reaction consists in a vessel fitted with a thermometer, a reflux condenser, and a stirrer designed to sweep the sides and bottom of the vessel.

The following examples are typical of methods for preparing the new compounds of this invention:

Example I 1,1-bis(4-hydroxyphenyl)-3,5-dimethylcyclohexane.

Thirty-eight parts (0.3 mol.) of 3,5-dimethylcyclohexanone and 57 parts (0.6 mol.) of phenol were mixed in a suitable vessel, the mixture saturated with dry hydrogen chloride gas, and allowed to stand at room temperature for three days. The reaction product was washed successively with water and cold toluene, filtered, the washed product suspended in water and sodium carbonate added until the slurry was neutral, and the solid filtered off and finally washed again successively with water and cold toluene. This product was a white crystalline solid melting at 171–173° C. On crystallization from hot toluene solution, thirty-nine parts of a product melting at 173–174° C. was obtained. Upon analysis, this product was found to contain 80.8 per cent carbon and 8.5 per cent hydrogen. The theoretical amounts of carbon and hydrogen in 1,1-bis(4-hydroxyphenyl)-3,5-dimethylcyclohexane, of molecular formula $C_{20}H_{24}O_2$ are 81.1 per cent and 8.1 per cent, respectively. The acetyl number of the recrystallized product was 291.9 while that of the expected compound is theoretically 294.7. The structural formula of 1,1-bis(4-hydroxyphenyl)-3,5-dimethylcyclohexane and the reaction by which it is prepared may be represented as follows:

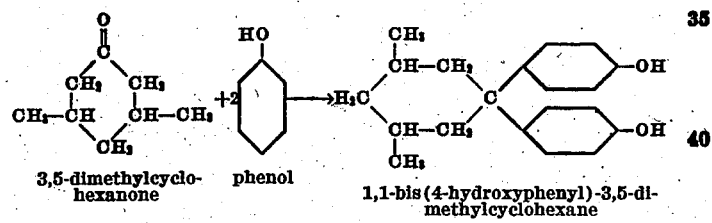

3,5-dimethylcyclohexanone    phenol    1,1-bis(4-hydroxyphenyl)-3,5-dimethylcyclohexane It is also possible to employ concentrated hydrochloric acid in the preparation of the above compound, as illustrated in the following example.

Example II

| | Parts |
|---|---|
| Phenol | 47.0 |
| 3,5-dimethylcyclohexanone | 37.5 |
| Hydrochloric acid (37–38% HCl; sp. gr. 1.19) | 145.0 |

The above substances are well mixed in a vessel fitted with a loop stirrer, a thermometer, and a reflux condenser, and allowed to stand, with occasional stirring, at 40–45° C. for 18 hours. The paste-like, semi-crystalline material was separated and purified. The product obtained by crystallizing from toluene solution melted at 173–174° C. and was identified as 1,1-bis(4-hydroxyphenyl)-3,5-dimethylcyclohexane.

*Example III*

One hundred twenty-six parts (1 mol.) of 3,5-dimethylcyclohexanone, 188 parts of phenol, and 580 parts of concentrated hydrochloric acid (37–38% HCl; sp. gr. 1.19) are mixed in a vessel fitted with loop stirrer, a thermometer, and a reflux condenser, and heated with continuous stirring at 40–45° C. for one hour, at the end of which time 15 parts of solvent naphtha are added and the mixture agitated at 40–45° C. for 26 hours. The paste-like semi-solid obtained is washed four times with hot water, dissolved in ethyl alcohol, the alcohol solution poured slowly with stirring into a large volume of water, the precipitate filtered, and washed on the filter with toluene until the washings are nearly colorless. The product obtained after repeated recrystallizations from toluene melts at 173–174° C., and is identified as 1,1-bis(4-hydroxyphenyl)-3,5-dimethylcyclohexane.

The compounds listed in the right-hand column of the table below are formed when the ingredients given in the other two columns are reacted in accordance with the methods outlined in the above examples.

| Dialkylcyclohexanone | | |
|---|---|---|
| 2,4-dimethylcyclohexanone | +phenol | 1,1-bis (4-hydroxyphenyl)-3,4-dimethylcyclohexane |
| 3,5-dimethylcyclohexanone | +o-cresol | 1,1-bis (3-methyl-4-hydroxyphenyl)-3,5-dimethylcyclohexane |
| 3,5-dimethylcyclohexanone | +m-cresol | 1,1-bis (2-methyl-4-hydroxyphenyl)-3,5-dimethylcyclohexane |
| 2,5-dibutylcyclohexanone | +phenol | 1,1-bis (4-hydroxyphenyl)-3,5-dibutylcyclohexane |
| 3-methyl-4-ethylcyclohexanone | +phenol | 1,1-bis (4-hydroxyphenyl)-3-methyl-4-ethylcyclohexane |
| 3,5-dimethylcyclohexanone | +o-amylphenol | 1,1-bis (3-amyl-4-hydroxyphenyl)-3,5-dimethylcyclohexane |

Any one of the above mononuclear phenols may be condensed with any one of the dialkylcyclohexanones and compounds are formed in which the benzene rings are attached, at the para positions to the phenolic hydroxyls, to the carbon atom of the cyclohexane residue to which was originally attached the ketone oxygen atom. Water is eliminated in these reactions.

The reactants are preferably employed in substantially chemically equivalent proportions, i. e., one mol. of the ketone to two mols of the phenol. However, quantities outside this range are not precluded, and, sometimes, in the case of difficulty reacting phenols, the phenol may even be advantageously employed in excess. The ketone should occasionally be added in small successive quantities in order to minimize self-condensation.

The reaction may be conducted in the presence of inert solvents, e. g., toluene, benzene, chlorobenzene, glacial acetic acid, petroleum naphtha, gasoline, solvent naphtha, etc.

Temperatures should preferably range from 20° C. to 90° C. Below 20° C. little reaction takes place and above 90° C. undesirable side reactions are evidenced. The most generally suitable working range is from 30–60° C.

The time of reaction should vary with the temperature, lower temperatures requiring a longer period of time for completion of the reaction. Maximum yields are obtained after periods of time ranging from a few hours up to several days. The presence, nature, and quantity of the acid catalyst also should be considered. Gaseous hydrogen chloride under the conditions of the examples does not cause the reaction to proceed as rapidly as concentrated hydrochloric acid. The speed of reaction also varies somewhat with the reactants, particularly the phenol. The homologs of phenol generally require a longer period of reaction than does phenol itself.

The catalyst is preferably hydrochloric acid, although strong mineral acids generally, e. g., hydrobromic, sulfuric, phosphoric, etc., are operable to some extent. It is often advantageous to employ mixtures of the strong mineral acid with small amounts of boric acid or with lower aliphatic acids, such as acetic. Boric acid sometimes causes the production of lighter-colored products, and in cases where sulfuric acid is used in conjunction with boric acid extensive sulfonation is prevented.

The amount of the catalyst should often be large, in quantities even up to 3–5 mols per mol. of phenol. Sulfuric acid, for example, seems to be used best in quantities of 4.0–4.5 mols per mol. of phenol. The concentration of the catalyst should depend upon the nature of the acid. Anhydrous hydrogen chloride or concentrated hydrochloric acid both give excellent results whereas dilute hydrochloric is much less satisfactory. The concentration of sulfuric acid should be kept below 70–80 per cent as otherwise extensive sulfonation of the phenol takes place.

The new phenols described herein show considerable chemical differences from analogously constituted compounds such as 1,1-bis(4-hydroxyphenyl)-4-methylcyclohexane. The compounds of the present invention differ not only in the number of alkyl groups on the cyclohexane ring, but also in their positions. The formation of the compounds disclosed herein could not be predicted because of the well known fact that a change in the number and the position on a carbocyclic ring of various non-reactive substituent groups greatly affects the reactivity of substances wherein these variations are made.

The compounds of the present invention have greater utility than the closest known related compounds, as for example in the manufacture of polyether resins from aliphatic dihalides in accordance with the methods given in the application of J. A. Arvin, Serial No. 651,634 filed January 13, 1933. These resins are preferably made by heating above 100° C. in polymerizing proportions the polyhalide and the alkali or alkaline earth metal salt of the phenol. Thus, the resin made by reacting 1,1-bis(4-hydroxyphenyl)-3,5-dimethylcyclohexane with $\beta,\beta'$-dichlorodiethyl ether is superior to the resin similarly made with 1,1-bis(4-hydroxyphenyl)-4-methylcyclohexane in having a higher softening temperature. The resin from 1,1-bis(4-hydroxyphenyl)-3,5-dimethylcyclohexane and $\beta,\beta'$-dichlorodiethyl ether softens at about 95° C. whereas the similar resin from 1,1-bis(4-hydroxyphenyl)-4-methylcyclohexane softens at about 90° C. This difference appears small but is of definite importance in resins of this type. It is furthermore an unexpected result since the addition of alkyl groups to the benzene rings lowers the softening point.

The phenols of this invention are likewise employed advantageously for making resins with formaldehyde or with inorganic polybasic acid halides in accordance with the disclosure in the application of J. A. Arvin, Serial No. 723,795 filed May 3, 1934, and that of F. C. Wagner, Serial No. 664,032 filed April 1, 1933. My new phenols may be halogenated to form derivatives also suitable for making any of the above type resins. These phenols may also be sulfonated to form valuable wetting and dispersing agents, or they may be nitrated to produce dye intermediates.

As many apparently widely different embodiments of this invention may be made without departing from the spirit and scope thereof, it is to be understood that I do not limit myself to the specific embodiments thereof except as defined in the appended claims.

I claim:

1. The condensation product of 3,5-dimethylcyclohexanone and a mononuclear monohydric phenol having its para position to phenolic hydroxyl unoccupied.

2. 1,1-bis(4-hydroxyphenyl)-3,5-dimethylcyclohexane.

3. A process which comprises reacting 3,5-dimethylcyclohexanone and a mononuclear monohydric phenol having its para position to phenolic hydroxyl unoccupied.

4. A process which comprises reacting 3,5-dimethylcyclohexanone and phenol.

ELMER K. BOLTON.